(12) United States Patent
Mochizuki et al.

(10) Patent No.: US 10,947,361 B2
(45) Date of Patent: Mar. 16, 2021

(54) ETHYLENE POLYMER, STRETCHED MOLDED ARTICLE AND MICROPOROUS MEMBRANE

(71) Applicant: Asahi Kasei Kabushiki Kaisha, Tokyo (JP)

(72) Inventors: Shinsuke Mochizuki, Tokyo (JP); Hidenobu Takeyama, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 15/778,706

(22) PCT Filed: Oct. 25, 2017

(86) PCT No.: PCT/JP2017/038466
§ 371 (c)(1),
(2) Date: May 24, 2018

(87) PCT Pub. No.: WO2018/088209
PCT Pub. Date: May 17, 2018

(65) Prior Publication Data
US 2019/0248979 A1 Aug. 15, 2019

(30) Foreign Application Priority Data

Nov. 8, 2016 (JP) .............................. JP2016-218190

(51) Int. Cl.
| | | |
|---|---|---|
| *C08F 10/02* | (2006.01) | |
| *C08J 9/28* | (2006.01) | |
| *C08J 5/18* | (2006.01) | |
| *B29C 55/00* | (2006.01) | |
| *B29C 55/16* | (2006.01) | |
| *C08F 4/659* | (2006.01) | |
| *B29K 105/00* | (2006.01) | |
| *B29L 31/00* | (2006.01) | |

(52) U.S. Cl.
CPC .............. *C08J 9/28* (2013.01); *B29C 55/005* (2013.01); *B29C 55/16* (2013.01); *C08F 10/02* (2013.01); *C08J 5/18* (2013.01); *B29K 2023/06* (2013.01); *B29K 2105/0061* (2013.01); *B29L 2031/755* (2013.01); *C08F 4/65908* (2013.01); *C08F 4/65912* (2013.01); *C08F 4/65916* (2013.01); *C08F 2410/01* (2013.01); *C08F 2420/02* (2013.01); *C08J 2201/0502* (2013.01); *C08J 2323/06* (2013.01); *C08J 2323/08* (2013.01)

(58) Field of Classification Search
CPC .... C08F 10/02; C08F 110/02; C08F 2500/24; C08F 4/6165; C08F 4/6567; C08J 2323/06
See application file for complete search history.

(56) References Cited

U.S. PATENT DOCUMENTS

| 4,283,515 A * | 8/1981 | Gibbs .................... C08F 10/00 502/111 |
| 2014/0329921 A1* | 11/2014 | Robert .................. C08F 110/02 521/143 |
| 2015/0249242 A1 | 9/2015 | Kamo et al. |

FOREIGN PATENT DOCUMENTS

| JP | 2002-338730 A | 11/2002 |
| JP | 2007-119751 A | 5/2007 |
| JP | 4098401 B | 6/2008 |
| JP | 2013-199597 A | 10/2013 |
| JP | 2014-055287 A | 3/2014 |
| JP | 2014-118515 A | 6/2014 |
| JP | 2014-118535 A | 6/2014 |
| JP | 5586152 B | 9/2014 |
| JP | 2015-180716 A | 10/2015 |

OTHER PUBLICATIONS

Supplemental European Search Report issued in corresponding European Patent Application No. 17868941.0 dated Feb. 4, 2019.
International Preliminary Report on Patentability issued in corresponding International Patent Application No. PCT/JP2017/038466 dated May 14, 2019.
International Search Report issued in corresponding International Patent Application No. PCT/JP2017/038466 dated Jan. 23, 2018.
Uehara et al., "Solid-state 1H-NMR relaxation behavior for ultra-high-molecular-weight polyethylene reactor powders with different morphologies," Polymer Journal, 44 (8): 795-801 (2012).
Tapash, "A New Solid-State NMR Method Reveals the Influence of Chain Structure and Thermal History on the Crystal-Amorphous Interface in Polyethylenes," <<https://shareok.org/bitstream/handle/11244/48952/ Tapash_okstate_0664D_14523.pdf?sequence=1 &isAllowed=y>> (2016).
Egorov et al., "Features of the Amorphous-Crystalline Structure of UHMWPE," Polymer Science, Series C: 53 (1): 75-88 (2011).
Liu et al., "Tuning the water permeability of ultra-high molecular weight polyethylene microporous membrane by molecular self-assembly and flow field," Polymer, 55: 2113-2124 (2014).

* cited by examiner

*Primary Examiner* — Gregory Listvoyb
(74) *Attorney, Agent, or Firm* — Morgan, Lewis & Bockius LLP

(57) ABSTRACT

The present invention presents an ethylene polymer, wherein the ethylene polymer has a weight average molecular weight (Mw) of 200,000 or more and 3,000,000 or less, a proportion of a component ($\alpha 130$) with the lowest mobility of 40% or more and 60% or less, and a ratio $\beta/\gamma$ of a middle motion component ($\beta$) to a component ($\gamma$) with the highest mobility of 1.0 or more and 4.0 or less when a three-component approximation of free induction decay at 130° C. measured by a solid echo method of pulse NMR is performed.

15 Claims, No Drawings

ETHYLENE POLYMER, STRETCHED MOLDED ARTICLE AND MICROPOROUS MEMBRANE

TECHNICAL FIELD

The present invention relates to an ethylene polymer, a stretched molded article and a microporous membrane containing the same.

BACKGROUND ART

Ethylene polymers are used for various uses such as films, sheets, microporous membranes, fibers, and molded articles. Ethylene polymers having high molecular weights are used as starting materials of microporous membranes for secondary batteries represented especially by lead storage batteries and lithium ion batteries. Examples of characteristics required for microporous membranes for lithium ion batteries include an insulation characteristic, ion permeability and a pore-closing property. To prevent short circuits due to the shrinkage of a membrane at the time of battery assembly and the heat shrinkage of a membrane at the time of high temperatures, low heat shrinkability is required. For this reason, methods described in Patent Literature 1 to 3 are proposed as methods for suppressing heat shrinkage.

CITATION LIST

Patent Literature

Patent Literature 1: Japanese Patent No. 4098401
Patent Literature 2: Japanese Unexamined Patent Application Publication No. 2013-199597
Patent Literature 3: Japanese Patent No. 5586152

SUMMARY OF INVENTION

Technical Problem

However, the cost reduction in members has been strongly required with high demand growth, and improvement in not only membrane performance but also productivity has been desired in the field of microporous membranes for secondary batteries in recent years. Annealing is generally performed in processes for manufacturing microporous membranes and the like to suppress shrinkage under conditions of use and heat shrinkage under high temperature conditions due to the relaxation of stretch stress. The relaxation of stretch stress proceeds more easily as the temperature becomes higher. Therefore, it is considered that stress relaxation is conducted for a short period of time by raising the annealing temperature to increase productivity, but a problem is that pores are blocked in high temperature annealing, resulting in the reduction in porosity. In techniques disclosed by cited Literature 1 to 3, effects as to high-speed productivity are not mentioned. It has been desired to have the maintenance of low heat shrinkage and porosity compatible. No defective appearance such as unevenness, lines and white spots due to unmelted substances is required for products such as microporous membranes.

The problem to be solved by the present invention is to provide an ethylene polymer that enables obtaining microporous membranes and the like that are excellent in appearance and the balance between the maintenance of porosity and the maintenance of low heat shrinkage even at the time of high-speed manufacturing, and a stretched molded article containing the same.

Solution to Problem

The present inventors have advanced research earnestly to solve the above-mentioned problem, consequently found that an ethylene polymer having a predetermined weight average molecular weight, and predetermined values of a composition fraction of a component ($\alpha$130) with the lowest mobility and a composition ratio $\beta/\gamma$ of a middle motion component ($\beta$) to a component ($\gamma$) with the highest mobility obtained when the three-component approximation of free induction decay at 130° C. measured by a solid echo method of pulse NMR is performed can solve the above-mentioned problem, and completed the present invention.

That is, the present invention is as follows.

[1]
An ethylene polymer, wherein the ethylene polymer has a weight average molecular weight (Mw) of 200,000 or more and 3,000,000 or less,
a proportion of a component ($\alpha$130) with the lowest mobility of 40% or more and 60% or less, and a ratio $\beta/\gamma$ of a proportion of a middle motion component ($\beta$) to a proportion of a component ($\gamma$) with the highest mobility of 1.0 or more and 4.0 or less when a three-component approximation of free induction decay at 130° C. measured by a solid echo method of pulse NMR is performed.

[2]
The ethylene polymer according to [1], wherein the ethylene polymer has a ratio ($\beta$130/$\alpha$30) of a proportion of the component ($\alpha$130) with the lowest mobility measured at 130° C. to a proportion of a component ($\alpha$30) with the lowest mobility measured at 30° C. by the solid echo method of pulse NMR of 0.1 or more and 0.65 or less.

[3]
The ethylene polymer according to [1] or [2], wherein the ethylene polymer has a weight average molecular weight (Mw) of 250,000 or more and 800,000 or less.

[4]
The ethylene polymer according to any of [1] to [3], wherein the ethylene polymer has a molecular weight distribution (Mw/Mn) of 5 or more and 15 or less.

[5]
The ethylene polymer according to any of [1] to [4], wherein the ethylene polymer has a content of one or more selected from the group consisting of Ti, Mg and Al of 50 ppm or less.

[6]
The ethylene polymer according to any of [1] to [5], wherein a shape of the ethylene polymer is powder.

[7]
The ethylene polymer according to any of [1] to [6], wherein the ethylene polymer has a ratio D90/D10 between particle sizes measured using a laser particle size meter of 1.30 to 1.80.

[8]
A stretched molded article containing the ethylene polymer according to any of [1] to [7].

[9]
A microporous membrane containing the ethylene polymer according to any of [1] to [7].

Advantageous Effects of Invention

According to the present invention, an ethylene polymer that are excellent in appearance and the balance between porosity and low heat shrinkage even at the time of high-speed manufacturing, and a stretched molded article containing the same can be provided. Further surprisingly enough, the generation of sediment at the die of a processing machine is suppressed, and the long-term operation of the manufacturing machine of stretched molded articles and improvement in membrane quality are attained by using the ethylene polymer of the present invention.

DESCRIPTION OF EMBODIMENTS

Aspects for performing the present invention (hereinafter also called "the present embodiments") will be described in detail hereinafter. The present invention is not limited to the present embodiments, and can be modified variously within the gist thereof and performed.

[Ethylene Polymer]

An ethylene polymer of the present invention has a weight average molecular weight (Mw) of 200,000 or more and 3,000,000 or less, a proportion of a component ($\alpha$130) with the lowest mobility of 40% or more and 60% or less, and a ratio $\beta/\gamma$ of a proportion of a middle motion component ($\beta$) to a proportion of a component ($\gamma$) with the highest mobility of 1.0 or more and 4.0 or less when a three-component approximation of free induction decay at 130° C. measured by a solid echo method of pulse NMR is performed.

The above-mentioned requirements will be described hereinafter.

[Weight Average Molecular Weight (Mw)]

The weight average molecular weight (Mw) of the ethylene polymer of the present embodiment is 200,000 or more and 3,000,000 or less, preferably 220,000 or more and 1,500,000 or less, more preferably 250,000 or more and 800,000 or less, and still more preferably 250,000 or more and 750,000 or less. The Mw of the ethylene polymer can be adjusted by adjusting polymerization conditions and the like properly using the below-mentioned catalyst. The weight average molecular weight (Mw) can be adjusted specifically by having hydrogen exist in a polymerization system, changing the polymerization temperature, and the like.

Since the weight average molecular weight (Mw) is 200,000 or more, the proportion of the component with the lowest mobility ($\alpha$130) measured at 130° C. by pulse NMR can be adjusted to a large value, resulting in the achievement of desired low heat shrinkability. Meanwhile, since the Mw is 3,000,000 or less, dissolution in a solvent and stretching are facilitated, resulting in an improvement in membrane appearance.

The weight average molecular weight (Mw) of the ethylene polymer of the present embodiment can be determined on the basis of a calibration curve prepared using commercial monodisperse polystyrene by measuring a solution in which the ethylene polymer is dissolved in orthodichlorobenzene by gel permeation chromatography (hereinafter also called "GPC"). The weight average molecular weight can be measured more specifically by a method described in Examples.

[Three-Component Approximation of Free Induction Decay Obtained from Pulse NMR]

The ethylene polymer of the present embodiment is approximated to the three components of a component ($\alpha$) with the lowest mobility, a middle motion component ($\beta$), and a component ($\gamma$) with the highest mobility by fitting the free induction decay (M(t)) of the ethylene polymer obtained by a solid echo method in pulse NMR measured at a specific temperature by the least squares method using Formula 1.

$$M(t)=\alpha \exp(-(1/2)(t/T_\alpha)^2)\sin bt/bt+\beta \exp(-(1/Wa)(t/T_\beta)^{Wa})+\gamma \exp(-t/T_\gamma) \quad \text{Formula 1}$$

$\alpha$: Composition fraction (%) of $\alpha$ Component
$T_\alpha$: Relaxation Time (msec) of $\alpha$ Component
$\beta$: Composition fraction (%) of $\beta$ Component
$T_\beta$: Relaxation Time (msec) of $\beta$ Component
$\gamma$: Composition fraction (%) of $\gamma$ Component
$T_\gamma$: Relaxation Time (msec) of $\gamma$ Component
t: Observation Time (msec)
Wa: Shape Factor (1<Wa<2)
b: Shape Factor (0.1<b<0.2)

Pulse NMR can be measured more specifically by a method described in Examples.

[Component ($\alpha$130) with the Lowest Mobility in Pulse NMR at 130° C.]

The proportion of the component ($\alpha$130) with the lowest mobility when the three-component approximation of free induction decay obtained by the solid echo method in pulse NMR measured at 130° C. (hereinafter also simply called component ($\alpha$130) or ($\alpha$130) with the lowest mobility) is performed is 40% or more and 60% or less, and preferably 40% or more and 55% or less.

Examples of a method for controlling the proportion of the ($\alpha$130) with the lowest mobility include, but are not particularly limited to, adjusting the weight average molecular weight to 200,000 or more and 3,000,000 or less, maintaining the temperature of ethylene polymer slurry at 65° C. or more until the ethylene polymer and a solvent are separated by a centrifuge at the time of producing the ethylene polymer, and adding humidified nitrogen to the ethylene polymer after centrifugation.

When the proportion of the component ($\alpha$130) is 40% or more, molecule motion at the time of high temperatures can be suppressed, resulting in the achievement of low heat shrinkability. Meanwhile, when the proportion of the component ($\alpha$130) is 60% or less, a microporous membrane that is excellent in appearance and heat shrinkage is obtained.

[Ratio $\beta/\gamma$ of Middle component ($\beta$) and Highly Mobile Component ($\gamma$) in pulse NMR at 130° C.]

The ratio $\beta/\gamma$ of the proportion of the middle motion component ($\beta$) to the proportion of the component ($\gamma$) with the highest mobility when the three-component approximation of free induction decay obtained by the solid echo method in pulse NMR measured at 130° C. is performed is 1.0 or more and 4.0 or less, preferably 1.0 or more and 3.0 or less, and more preferably 1.0 or more and 2.5 or less.

Examples of a method for controlling the ratio $\beta/\gamma$ of the middle motion component to the component with the highest mobility include adjusting the weight average molecular weight to 200,000 or more and 3,000,000 or less, bringing an ethylene feed port and a catalyst feed port in a polymerization vessel as close as possible, and adjusting the concentration of the slurry in the polymerization vessel to 30% or more and 50% or less.

When the $\beta/\gamma$ is 1.0 or more, the change in porosity at the time of annealing can be suppressed in a desired range, and sediment at the die can also be suppressed. Meanwhile, when $\beta/\gamma$ is 4.0 or less, a microporous membrane that is excellent in membrane appearance is obtained.

[Ratio $\alpha$130/$\alpha$30 of Lowly Mobile Component ($\alpha$130) in Pulse NMR at 130° C. to Low Motion Component ($\alpha$30) in Pulse NMR at 30° C.]

The ratio ($\alpha$130/$\alpha$30) of the proportion of the motion component ($\alpha$130) with the lowest mobility when the three-component approximation of free induction decay obtained by the solid echo method in pulse NMR measured at 130° C.

is performed to the proportion of the motion component (α30) with the lowest mobility when the three-component approximation of the free induction decay obtained by the solid echo method in pulse NMR measured at 30° C. is performed is preferably 0.1 or more and 0.65 or less, more preferably 0.4 or more and 0.65 or less, and still more preferably 0.55 or more and 0.60 or less.

Examples of a method for controlling the above-mentioned ratio (α130/α30) include a method such as centrifuging the polymerized slurry after retention for 2 hours or more.

Since the above-mentioned ratio (α130/α30) is 0.1 or more, the porosity tends to be able to be maintained at the time of annealing at 125° C. Meanwhile, since the above-mentioned ratio (α130/α30) is 0.65 or less, a membrane that is less uneven in porosity is obtained.

The above-mentioned ratio (α130/α30) can be determined by fitting the free induction decay (M(t)) of the ethylene polymer obtained by the solid echo method in pulse NMR measured at 30° C. and 130° C. by the least squares method using the Formula 1, and can be determined by a method described in Examples.

Examples of the ethylene polymer of the present embodiment include, but are not particularly limited to, an ethylene homopolymer, and/or copolymers of ethylene and other comonomers. Examples of the other comonomers include, but are not particularly limited to, α-olefins and vinyl compounds. Examples of the above-mentioned α-olefins include, but are not particularly limited to, α-olefins having 3 to 20 carbon atoms, and specifically include propylene, 1-butene, 4-methyl-1-pentene, 1-hexene, 1-octene, 1-nonene, 1-decene, 1-undecene, 1-dodecene, 1-tridecene and 1-tetradecene. Additionally, examples of the above-mentioned vinyl compounds include, but are not particularly limited to, vinyl cyclohexane, styrene and derivatives thereof. As the other comonomers, nonconjugated polyenes such as 1,5-hexadiene and 1,7-octadiene can also be used if needed. The above-mentioned copolymers may be random terpolymers. The other comonomers may be used alone or in combination of two or more.

When the ethylene polymer of the present embodiment includes a unit derived from a comonomer (hereinafter also called a comonomer unit), the content of the comonomer unit in the ethylene polymer is preferably 0.01 mol % or more and 5 mol % or less, more preferably 0.01 mol % or more and 2 mol % or less, and still more preferably 0.01 mol % or more and 1 mol % or less.

The molecular weight distribution (Mw/Mn) of the ethylene polymer of the present embodiment is preferably 5.0 or more and 15.0 or less, more preferably 5.5 or more and 14.0 or less, and still more preferably 6.0 or more and 12.0 or less.

The molecular weight distribution of the ethylene polymer can be adjusted to a small value by using the below-mentioned catalyst or keep conditions (hydrogen concentration, temperature, ethylene pressure and the like) in a polymerization system constant. Meanwhile, examples of a method adjusting the molecular weight distribution of the ethylene polymer to a large value include techniques such as changing conditions during polymerization (such as changing the concentration of hydrogen, which is a chain transfer agent, during polymerization, and changing the temperature) in batch polymerization and changing conditions in a polymerization system using a plurality of reactors in continuous polymerization.

When the molecular weight distribution is 5.0 or more, the ethylene polymer of the present embodiment has superior fabricability. Consequently, membrane appearance becomes excellent. Meanwhile, when the molecular weight distribution is 15.0 or less, the composition of the molecular weight is homogenous. Consequently, membrane appearance becomes excellent.

The molecular weight distribution (Mw/Mn) of the ethylene polymer of the present embodiment can be determined on the basis of a calibration curve prepared using commercial monodisperse polystyrene by measuring a solution in which the ethylene polymer is dissolved in orthodichlorobenzene by gel permeation chromatography (hereinafter also called "GPC"). The molecular weight distribution can be measured more specifically by a method described in Examples.

The content of one or more selected from the group consisting of Ti, Mg and Al (hereinafter also called the residual catalyst ash content) in the ethylene polymer of the present embodiment is preferably 50 ppm or less, more preferably 40 ppm or less, and still more preferably 30 ppm or less. A lower residual catalyst ash content in the ethylene polymer is more preferable. Since the residual catalyst ash content is in the above-mentioned range, the ethylene polymer tends to be superior in low heat shrinkability. The content of Ti, Mg and Al can be measured by a method described in Examples. To control the residual catalyst ash content to a low content, examples include adjusting pressure and separating the ethylene polymer and a solvent by centrifuge separation.

The content of one or more selected from the group consisting of Ti, Mg and Al is preferably the total content of Ti, Mg and Al.

The ethylene polymer of the present embodiment is preferably a spherical powder.

The particle size distribution (D90/D10) of the ethylene polymer of the present embodiment is preferably 1.30 or more and 1.80 or less, and more preferably 1.40 to 1.70. When the particle size distribution is in the above-mentioned range, the ethylene polymer tends to be superior in membrane appearance.

The particle size distribution is a value obtained using a laser particle size distribution measuring instrument, and can be measured using, for example, a SALD-2100 manufactured by SHIMADZU CORPORATION or the like.

The above-mentioned particle size distribution (D90/D10) means the ratio of the value of the particle size at which the integrated value is 90% (D90) to the value of the particle size at which the integrated value is 10% (D10) on a particle size distribution graph on which the horizontal axis represents the diameter size of particles and the vertical axis represents the percentage of the amount (number).

The above-mentioned particle size distribution (D90/D10) can be adjusted in the range of 1.30 or more and 1.80 or less specifically by techniques such as using the catalyst mentioned below and using batch polymerization.

[Catalyst Component]

A catalyst component that is used for producing the ethylene polymer of the present embodiment is not particularly limited, and can be produced using a Ziegler-Natta catalyst or a metallocene catalyst that are disclosed by, for example, Japanese Patent No. 5782558, Japanese Patent No. 5829257, Japanese Patent No. 4868853, Japanese Unexamined Patent Application Publication No. H10-218933 and the like.

[Method for Producing Ethylene Polymer]

Examples of a polymerizing method in a method for producing an ethylene polymer of the present embodiment include a method for polymerizing (copolymerizing) ethylene or monomers containing ethylene by suspension polymerization or gas phase polymerization.

In particular, the suspension polymerization, in which polymerization heat can be removed efficiently, is preferable. In a suspension polymerization, an inert hydrocarbon medium can be used as a medium, and also an olefin itself can also be used as a solvent.

Specific examples of the above-mentioned inert hydrocarbon medium include, but are not particularly limited to, aliphatic hydrocarbons such as propane, butane, isobutane, pentane, isopentane, hexane, heptane, octane, decane, dodecane, and kerosene; alicyclic hydrocarbons such as cyclopentane, cyclohexane and methyl cyclopentane; aromatic hydrocarbon such as benzene, toluene and xylene; halogenated hydrocarbon such as ethyl chloride, chlorobenzene, and dichloromethane; and a mixture thereof.

The polymerization temperature in a method for producing an ethylene polymer of the present embodiment is usually preferably 30° C. or more and 100° C. or less, more preferably 35° C. or more and 90° C. or less, and still more preferably 40° C. or more and 80° C. or less. Industrially efficient production is possible when the polymerization temperature is 30° C. or more. Meanwhile, continuous stable operation is possible when polymerization temperature is 100° C. or less.

The polymerization pressure in a method of producing an ethylene polymer of the present embodiment is usually preferably normal pressure or more and 2 MPa or less, more preferably 0.1 MPa or more and 1.5 MPa or less, and still more preferably 0.1 MP or more and 1.0 MPa or less. Since the pressure is normal pressure or more, an ethylene polymer having a low residual catalyst ash content tends to be obtained. Since the pressure is 2 MPa or less, the ethylene polymer tends to be able to be stably produced without the generation of massive scale. In view of controlling the $\beta/\gamma$, the feed port of ethylene is preferably as close to the catalyst feed port as possible.

As above-mentioned, the proportion of the $\alpha 130$ of the ethylene polymer of the present embodiment is 40% or more and 60% or less, and the $\beta/\gamma$ is 1.0 or more and 4.0 or less. That is, when an ethylene polymer is classified into three components by molecular mobility, it is necessary to control the amounts of the components properly. For that purpose, it is important to cause the entanglement of molecules without inhibiting crystallization.

In view of not inhibiting crystallization, it is preferable to maintain the temperature of the ethylene polymer slurry at 65° C. or more until the slurry after polymerization are separated into the ethylene polymer and the solvent by the centrifuge. Impurities can be removed effectively in centrifugal separation by maintaining the temperature of the ethylene polymer slurry at 65° C. or more, and the orderliness of the polymer in the solid phase state can be improved.

In view of causing the entanglement of molecules, the concentration of the slurry in the polymerization system is preferably 30% by mass or more and 50% by mass or less and more preferably 40% by mass or more and 50% by mass or less. Since the concentration of the slurry is 30% by mass or more, restraint between molecules tends to be able to be enhanced by maintaining the temperature near reactive sites on the catalyst moderately highly during polymerization and promoting the entanglement of molecules. Meanwhile, since the concentration of the slurry is 50% by mass or less, the ethylene polymer tends to be able to be stably produced without the generation of massive scale.

The $\alpha 130/\alpha 30$ of the ethylene polymer of the present embodiment is preferably 0.1 or more and 0.65 or less. To obtain such an ethylene polymer, it is preferable, for example, to retain the slurry of the ethylene polymer stagnate in a buffer tank or the like for 2 hours or more before the slurry is separated into the ethylene polymer and a solvent by the centrifuge. The composition fraction of the motion component ($\alpha 30$) with the lowest mobility at 30° C. of the ethylene polymer increases by retaining the polymer slurry for 2 hours or more, and the ratio of $\alpha 130/\alpha 30$ can be 0.1 or more and 0.65 or less.

A method for separating a solvent in a method for producing an ethylene polymer of the present embodiment can be performed by decantation, centrifuge separation, filter filtration or the like. Centrifuge separation is preferable in view of efficiency in the separation of the ethylene polymer and a solvent. The amount of a solvent contained in the ethylene polymer after solvent separation is not particularly limited, but is preferably 70% by mass or less, more preferably 60% by mass or less, and still more preferably 50% by mass or less on the basis of the weight of the ethylene polymer. Since the solvent is dried and removed with the solvent contained in the ethylene polymer little, metallic components or low molecular weight components contained in the solvent tend to hardly remain in the ethylene polymer.

The deactivation of the catalyst used to synthesize the ethylene polymer of the present embodiment is not particularly limited, but is preferably performed after the separation of the ethylene polymer and the solvent in view of controlling the composition fraction of $\alpha 130$. The deposition of the low molecular weight components, the catalyst components and the like contained in the solvent can be reduced by introducing an agent for deactivating the catalyst after the separation from a solvent.

Examples of the agent for deactivating a catalyst system include oxygen, water, alcohols, glycols, phenols, carbon monoxide, carbon dioxide, ethers, carbonyl compounds, and alkynes.

The drying temperature in a method for an ethylene polymer of the present embodiment is usually preferably 50° C. or more and 150° C. or less, more preferably 50° C. or more and 130° C. or less, and still more preferably 50° C. or more and 100° C. or less. Efficient drying is possible when the drying temperature is 50° C. or more. Meanwhile, it is possible to dry with the decomposition and crosslinking of the ethylene polymer suppressed when the drying temperature is 150° C. or less. In the present embodiment, other well-known components useful for producing an ethylene polymer can be contained besides components as mentioned above.

In a method for producing an ethylene polymer of the present embodiment, it is preferable to allow hydrogen to exist in the polymerization system to control the weight average molecular weight and the molecular weight distribution (Mw/Mn) and adjust the components with the lowest mobility ($\alpha 30$ and $\alpha 130$) and the ratio of the middle motion component ($\beta$) to the component ($\gamma$) with the highest mobility.

Hydrogen can be continuously fed to a polymerization reactor with a pump. The hydrogen concentration is preferably 10 to 20 mol %, and more preferably 12 to 18 mol % on the basis of ethylene in the gaseous phase.

[Additives]

The ethylene polymer of the present embodiment may further contain additives such as a counteragent, an antioxidant, and a light resistance stabilizer.

The counteragent is used as a chlorine scavenger of chlorine contained in the ethylene polymer, a fabrication aid or the like. Specific examples of the counteragent include, but are not particularly limited to, stearates of alkaline earth metals such as calcium, magnesium and barium. The content of the counteragent is not particularly limited, but is preferably 5,000 ppm or less, more preferably 4,000 ppm or less, and still more preferably 3,000 ppm or less.

Specific examples of the antioxidant include, but are not particularly limited to, phenolic antioxidants such as dibutylhydroxytoluene, pentaerythrityl-tetrakis[3-(3,5-di-t-butyl-4-hydroxyphenyl)propionate], and octadecyl-3-(3,5-di-t-butyl-4-hydroxyphenyl)propionate. The content of an antioxidant is not particularly limited, but is preferably 5,000 ppm or less, more preferably 4,000 ppm or less, and still more preferably 3,000 ppm or less.

Specific examples of the light resistance stabilizer include, but are not particularly limited to, benzotriazole light resistance stabilizers such as 2-(5-methyl-2-hydroxyphenyl)benzotriazole and 2-(3-t-butyl-5-methyl-2-hydroxyphenyl)-5-chlorobenzotriazole; and hindered amine light resistance stabilizers such as bis(2,2,6,6-tetramethyl-4-piperidine)sebacate and poly[{6-(1,1,3,3-tetrametylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light resistance stabilizer is not particularly limited, but is preferably 5,000 ppm or less, more preferably 4,000 ppm or less, and still more preferably 3,000 ppm or less.

An ethylene polymer having a different viscosity average molecular weight, molecular weight distribution and the like can also be blended in the ethylene polymer of the present embodiment, and another resin such as a low density ethylene polymer, a linear low density ethylene polymer, polypropylene and polystyrene can also be blended therein. The ethylene polymer of the present embodiment can be preferably used even though the ethylene polymer is a powder type or a pellet type.

[Use]

A molded article containing the ethylene polymer of the present embodiment can be preferably used as a stretched molded article, a microporous membrane or a separator for batteries. Examples of such a molded article include separators for secondary batteries, especially lithium ion secondary battery separators, high strength fibers, microporous membranes and gel-spun yarn.

EXAMPLES

The present invention will be described still more specifically hereinafter using Examples and Comparative Examples, but the present invention is not limited at all by the following Examples.

[Reference Example] Example of Synthesis of Catalyst

Preparation of Solid Catalyst Component [A]

First, 1,600 mL of hexane was added into an 8 L autoclave made of stainless steel and sufficiently purged with nitrogen. Then, 800 mL of a 1 mol/L solution of titanium tetrachloride in hexane and 800 mL of a 1 mol/L solution of an organic magnesium compound represented by the composition formula $AlMg_5(C_4H_9)_{11}(OSi(C_2H_5)H)_2$ in hexane was simultaneously added with stirring at 5° C. over 4 hours. The reaction was continued at 10° C. for 1 hour by heating the mixture slowly after the addition. A solid catalyst component [A] was prepared by removing 1,600 mL of the supernatant liquid after the reaction and washing with 1,600 mL of hexane 5 times.

Preparation of Solid Catalyst Component [B]

(1) Synthesis of (B-1) Carrier

The 8 L autoclave made of stainless steel sufficiently purged nitrogen was charged with 1,000 mL of a 2 mol/L solution of hydroxytrichlorosilane in hexane. Then, 2,550 mL of a solution of an organic magnesium compound represented by the composition formula $AlMg_5(C_4H_9)_{11}(OC_4H_9)_2$ in hexane (equivalent to 2.68 mol of magnesium) was dropped with stirring at 65° C. over 4 hours. Further, the reaction was continued with stirring at 65° C. for 1 hour. The supernatant liquid was removed after the reaction, followed by wash with 1,800 mL of hexane 4 times to obtain a (B-1) carrier.

(2) Preparation of Solid Catalyst Component [B]

To 1,970 mL of hexane slurry containing 110 g of the above-mentioned (B-1) carrier was simultaneously added 110 mL of a 1 mol/L solution of titanium tetrachloride in hexane and 110 mL of a 1 mol/L solution of diethyl aluminum chloride in hexane with stirring at 50° C. over 1 hour. The reaction was continued at 50° C. for 1 hour after the addition. The solid catalyst component [B] was prepared by removing 1,100 mL of the supernatant liquid after the reaction and washing with 1,100 mL of hexane twice.

Preparation of Solid Catalyst Component [C]

To 1,970 mL of hexane slurry containing 110 g of the above-mentioned (B-1) carrier was simultaneously added 110 mL of a 1 mol/L solution of titanium tetrachloride in hexane and 110 mL of a 1 mol/L solution of an organic magnesium compound represented by the composition formula $AlMg_5(C_4H_9)_{11}(OSi(C_2H_5)H)_2$ in hexane with stirring at 10° C. over 1 hour. The reaction was continued at 10° C. for 1 hour after the addition. The solid catalyst component [C] was prepared by removing 1,100 mL of the supernatant liquid after the reaction and washing with 1,100 mL of hexane twice.

Preparation of Solid Catalyst Component [D]

(1) Synthesis of (D-1) Carrier

As a precursor of a carrier (D-1), silica having an average particle size of 7 µm, a specific surface area of 660 $m^2/g$, a pore volume of 1.4 mL/g and a compressive strength of 7 MPa was used.

Silica (130 g) after heat treatment was dispersed in 2,500 mL of hexane in the autoclave having a capacity of 8 L and purged with nitrogen to obtain slurry. To the obtained slurry was added 195 mL of a solution (concentration 1 M) of triethyl aluminum, which is a Lewis acid compound in hexane with stirring at 20° C. Then, the mixture was stirred for 2 hours, resulting in the reaction of hydroxyl groups on the surface of silica with triethyl aluminum to prepare 2,695 mL of slurry of a carrier (D-1) adsorbing triethyl aluminum in hexane.

Preparation of Transition Metal Compound Component [E]

As a transition metal compound (E-1), [(N-t-butyl-amide)(tetramethyl-η5-cyclopentadienyl) dimethylsilane]titanium- 1,3-pentadiene (hereinafter abbreviated as "complex 1") was used. As an organic magnesium compound (E-2), the composition formula Mg($C_2H_5$)($C_4H_9$) (hereinafter abbreviated as "Mg1") was used.

In 1,000 mL of an isoparaffin hydrocarbon (ISOPAR E produced by Exxon Mobil Corporation), 200 mmol of the complex 1 was dissolved, and 40 mL of a solution (concentration 1 M) of Mg1 in hexane was added to this. The concentration of the complex 1 was adjusted to 0.1 M by further adding hexane to obtain a transition metal compound component [E].

Preparation of Activator [F]

As a borate compound (F-1), 17.8 g of bis(hydrogenated tallow alkyl)methylammonium-tetrakis(pentafluorophenyl)borate (hereinafter abbreviated as "borate") was added to 156 mL of toluene, followed by dissolution to obtain a 100 mmol/L solution of the borate in toluene. 15.6 mL of a 1 mol/L solution of ethoxy diethyl aluminum in hexane as an (F-2), was added to this solution of the borate in toluene at room temperature. The concentration of the borate was adjusted to 70 mmol/L by further adding toluene. Then, the mixture was stirred at room temperature for 1 hour to prepare an activator [F] containing the borate.

Preparation of Solid Catalyst [D]

A solid catalyst [D] was prepared by simultaneously adding 219 mL of the activator [F] and 175 mL of the transition metal compound component [E] obtained by the above-mentioned operations to 2,695 mL of the slurry of the carrier (D-1) obtained by the above-mentioned operation with stirring at 400 rpm at 25° C. from different lines using metering pumps for addition time of 30 minutes and then continuing the reaction for 3 hours.

Preparation of Liquid Component [G]

As an organic magnesium compound (G-1), the composition formula AlMg$_6$($C_2H_5$)$_3$($C_4H_9$)$_{12}$ (hereafter abbreviated as "Mg2") was used.

A fluid component [G] was prepared by adding 40 mL of hexane and the Mg2 equivalent to 38.0 mmol as a total amount of Mg and Al in a 200 mL flask with stirring, adding 40 mL hexane containing 2.27 g (37.8 mmol) of methylhydropolysiloxane (viscosity of 20 centistokes at 25° C., hereinafter abbreviated as "siloxane compound") thereto with stirring at 20° C., then raising the temperature to 80° C., and reacting the mixture with stirring for 3 hours.

Example 1

Hexane, ethylene, hydrogen, and a catalyst were continuously fed to a vessel type 300 L polymerization reactor with a stirring device. The polymerization pressure was 0.5 MPa. The polymerization temperature was maintained at 80° C. by jacket cooling. The solid catalyst component [A] and triisobutylaluminum as a promoter were used. Triisobutylaluminum was added into the polymerization vessel at a speed of 10 mmol/hr. The solid catalyst component [A] was fed so that the production speed of an ethylene polymer was 10 kg/hr and the concentration of slurry in the polymerization vessel was 40% by mass. Hexane was fed so that the level of the surface of the liquid was kept constant. Hydrogen was continuously fed by a pump so that the concentration of hydrogen on the basis of ethylene in the gaseous phase was 15 mol %. The catalyst activity was 75,000 g-PE/g-solid catalyst component [A]. The polymerization slurry was continuously extracted to a flash drum at a pressure of 0.05 MPa and a temperature of 70° C., resulting in the separation of unreacted ethylene and hydrogen.

Next, the polymerization slurry was retained in a buffer tank for 2 hours with the polymerization slurry kept warm at 66° C. or more, then continuously fed to a centrifuge, and separated into a polymer and the other such as the solvent. The content of the solvent and the like on the basis of the polymer at that time was 45%.

The separated ethylene polymer powder was dried while being blown with nitrogen at 85° C. In this drying step, steam was sprayed on the powder after polymerization, resulting in the deactivation of the catalyst and the promoter. To the obtained ethylene polymer powder was added 1,000 ppm of calcium stearate (produced by Dainichi Chemical Industry Co., Ltd., C60), and the mixture was mixed homogenously using a Henschel mixer. An ethylene polymer powder was obtained by sieving the obtained ethylene polymer powder using a sieve having a mesh size of 425 m and removing ethylene polymer powder that did not pass through the sieve. The characteristics of the obtained ethylene polymer was measured by methods shown below. Results are shown in Table 1.

(Method for Manufacturing Microporous Membrane)

The ethylene polymer mixture was obtained by adding 0.3 parts by mass of pentaerythrityl-tetrakis[3-(3,5-di-t-butyl-4-hydroxyphenyl)propionate] as an antioxidant to 100 part by mass of the ethylene polymer powder and performing a dry blend using a tumbler blender. The obtained ethylene polymer mixture was fed to a two-shaft extruder through a feeder in a nitrogen atmosphere after nitrogen purge. Further, 150 parts by mass of a liquid paraffin (P-350 (registered trademark) produced by MATSUMURA OIL Co., Ltd.) was injected into the extruder by a side feed. The mixture was kneaded under a condition of 200° C., extruded from a T-die disposed at the tip of the extruder, and then immediately solidified by cooling by casting rolls cooled at 25° C. to form a gel sheet having a thickness of 900 μm.

This gel sheet was stretched 7×7 times at 120° C. using a simultaneous biaxial stretching machine. This stretched membrane was then immersed in methyl ethyl ketone and dried after the extraction removal of the liquid paraffin. The stretched membrane was annealed at 125° C. or more for 3 minutes to obtain a microporous membrane. Physical properties of the obtained membrane were measured by methods shown below. Results are shown in Table 1.

[Method for Measuring Various Characteristics and Physical Properties]

(1) Measurement of Molecular Weight

A sample solution prepared by introducing 15 mL of o-dichlorobenzene into 20 mg of the ethylene polymer and stirring the mixture at 150° C. for 1 hour was measured according to the following conditions by gel permeation chromatography (GPC). From the measurement result, the number average molecular weight (Mn), the weight average molecular weight (Mw), and the molecular weight distribution (Mw/Mn) were determined on the basis of a calibration curve prepared using commercial monodisperse polystyrene.

Device: 150-C ALC/GPC manufactured by Nihon Waters K.K.

Detector: RI detector

Mobile Phase: o-dichlorobenzene (for high-speed liquid chromatographs)

Flow Rate: 1.0 mL/min

Column: A column in which one AT-807S manufactured by Shodex and two TSK-gelGMH-H$_6$ manufactured by Tosoh Corporation were connected was used.
Column Temperature: 140° C.
(2) Pulse NMR The composition fractions of three components at 30° C. and 130° C. measured by the solid echo method of pulse NMR was measured under the following conditions.
Measuring Device: JNM-Mu25 manufactured by JEOL Ltd.
Observed core: $^1$H
Measurement: T$_2$
Measuring method: Solid echo method
Pulse width: 2.2 to 2.3 μs
Pulse interval: 7.0 μs to 9.2 μs
Number of integration times: 256 times
Measurement Temperature: 30° C., 50° C., 70° C., 90° C., 110° C. and 130° C. (the measurement temperature was the temperature in a sample, and the device temperature was adjusted so that the temperature in the sample was the measurement temperature 5 minutes after the device temperature reached a set temperature, followed by the start of measurement.)
Repetition time: 3 s
Analyzing Method: The sample was approximated to three components by performing fitting using Formula 1 by analysis software (IGOR Pro6.3).

$$M(t)=\alpha \exp(-(1/2)(t/T_\alpha)^2)\sin bt/bt+\beta \exp(-(1/Wa)(t/T_\beta)^{Wa})+\gamma \exp(-t/T_\gamma) \quad \text{Formula 1}$$

α: Composition fraction (%) of α Component
T$_\alpha$: Relaxation Time (msec) of α Component
β: Composition fraction (%) of β Component
T$_\beta$: Relaxation Time (msec) of β Component
γ: Composition fraction (%) of γ Component
T$_\gamma$: Relaxation Time (msec) of γ Component
t: Observation Time (msec)
Wa: Shape Factor
b: Shape Factor (3) Residual Catalyst Ash Content (Total Content of Ti, Mg and Al)

A liquid obtained by weighing 0.2 g of a sample in the decomposition container made from Teflon (registered trademark), adding high-purity nitric acid thereto, decomposing the mixture under pressure in a microwave decomposition device ETHOS-TC manufactured by Milestone General K.K., and then adjusting the total volume to 50 mL with the pure water purified by an ultrapure water producer manufactured by Nihon Millipore K.K. was used as a test liquid. As to the above-mentioned test liquid, Ti, Mg and Al were quantified using an inductively coupled plasma mass spectrometer (ICP-MS) X series 2 manufactured by Thermo Fisher Scientific K.K. by the internal standard method.

(4) Particle Size Distribution (D90/D10)

D90 and D10 were measured by the laser particle size distribution measuring instrument (manufactured by SHIMADZU CORPORATION, SALD-2100), and D90/D10 were defined as the particle size distribution.

(5) Membrane Thickness

The membrane thickness of the microporous membrane was measured at a room temperature of 23° C. using a micro thickness gage (Type KBM (registered trademark)) manufactured by Toyo Seiki Seisaku-sho, Ltd.

(6) Heat Shrinkage Percent

The microporous membrane was cut in a width of 10 mm and a length of 100 mm in the direction of MD. The cut membrane was placed in a hot air oven at 130° C. and heated for 1 hour. The heat shrinkage percentage (%) was determined by the ratio of the shrunk length to the original length (100 mm).

(7) Porosity

A sample 10 cm×10 cm square was cut out of the microporous membrane. The volume (cm$^3$) and mass (g) thereof were determined, and the porosity was calculated by those and the membrane density (g/cm$^3$) using the following Formula.

Porosity=(Volume−Mass/Membrane Density)/Volume×100

The membrane density was 0.95 g/cm$^3$.

(8) Changes in Heat Shrinkage Percentage and Porosity

The change from the heat shrinkage percentage and porosity of the microporous membrane obtained at a temperature of 125° C. for an annealing time of 3 minutes to those of a microporous membrane obtained under annealing conditions changed into a temperature of 133° C. and an annealing time of 60 seconds was measured. The heat shrinkage percentage was measured by the method of (6), and the porosity was measured by the method of (7).

Change in Heat Shrinkage Percentage=Heat Shrinkage Percentage$_{125}$−Heat Shrinkage Percentage$_{133}$ Heat Shrinkage Percentage$_{125}$: Heat Shrinkage Percentage at the time of annealing at 125° C. for 3 Minutes
Heat Shrinkage Percentage$_{133}$: Heat Shrinkage Percentage at the time of annealing at 133° C. for 1 Minute In Table 1, the change in the heat shrinkage percentage that was 1% or less was defined as ⊚, the change in the heat shrinkage percentage that was more than 1% and less than 3% was defined as ○, and the change in the heat shrinkage percentage that was 3% or more was defined as x.

Change in Porosity=Porosity$_{125}$−Porosity$_{133}$

Porosity$_{125}$: Porosity at the time of annealing at 125° C. for 3 minutes
Porosity$_{133}$: Porosity at the time of annealing at 133° C. for 1 minute In Table 1, the change in the porosity that was less than 5% was defined as ⊚, the change in the porosity that was 5% or more and less than 10% was defined as ○, and the change in the porosity that was 10% or more was defined as x.

(9) Membrane Appearance

Defective appearances such as unevenness, lines and white spots due to unmelted substances per 100 m of the microporous membrane were observed visually. In Table 1, when no defective appearances can be found, it was defined as ⊚. When there are 3 or less, it was defined as ○. When there are 4 or more, it was defined as x.

(10) Unevenness of the Porosity

As to the unevenness of the priority, samples 10 cm×10 cm square were cut out of portions located at the center and an end in the TD direction of the microporous membrane, respectively. The difference in the porosity was measured by the same method as (7). The difference in the porosity that was less than 1% was defined as ⊚, the difference in the porosity that was 1% or more and less than 2% was defined as ○, and the difference in the porosity that was 2% or more was defined as x.

(11) Sediment of Die

When a membrane was produced for 5 hours, deposit on the die of the extruder was observed. In Table 1, when there was no sediment, it was defined as ○. When sediment was generated, it was defined as x.

Example 2

The ethylene polymer powder of Example 2 was obtained by the same operations as in Example 1 except that the solid catalyst component [B] was used without using the solid catalyst component [A] and the hydrogen concentration was 14 mol % in the polymerization step. The microporous membrane of Example 2 was obtained by the same operations as in Example 1.

Example 3

The ethylene polymer powder of Example 3 was obtained by the same operations as in Example 1 except that the hydrogen concentration was 10 mol % in the polymerization step. The microporous membrane of Example 3 was obtained by the same operations as in Example 1.

Example 4

The ethylene polymer powder of Example 4 was obtained by the same operations as in Example 1 except that the solid catalyst component [C] was used without using a solid catalyst component [A] and the hydrogen concentration was 10 mol % in the polymerization step. The microporous membrane of Example 4 was obtained by the same operations as in Example 1.

Example 5

The same polymerization reactor as Example 1 was used, the polymerization pressure was maintained at 0.8 MPa, and the polymerization temperature was maintained at 75° C. by jacket cooling. Hexane was fed to the polymerization vessel at 60 L/hr. The liquid component [G] was fed at 5 mol/hr. The solid catalyst component [D] was used, brought in contact with hydrogen at 2 L/hr beforehand, and fed to the polymerization vessel so that the production speed was 10 kg/hr and the concentration of slurry in a polymerization system was 40% by mass. The ethylene polymer powder of Example 5 was obtained by the same operations as in Example 1 in the steps after the polymerization vessel. The microporous membrane of Example 5 was obtained by the same operations as in Example 1.

Example 6

In first polymerization, the same polymerization reactor as Example 1 was used. The polymerization pressure power was 0.5 MPa. The Polymerization temperature was maintained at 80° C. by jacket cooling. Hexane was fed at a speed of 20 liters/hour. The solid catalyst component [A] and triisobutylaluminum as a promoter were used. Triisobutylaluminum was added into the polymerization vessel at a speed of 10 mmol/hr. The solid catalyst component [A] was fed so that the concentration of slurry in the polymerization vessel was 40% by mass. The polymerization slurry was extracted so that the surface level was kept constant. Hydrogen was continuously fed by a pump so that the hydrogen concentration on the basis of the ethylene in the gaseous phase was 6 mol %. The polymerization slurry was continuously extracted to the flash drum at a pressure of 0.05 MPa and a temperature of 70° C., resulting in the separation of unreacted ethylene and hydrogen. Then, in the second polymerization, the polymerization slurry was continuously introduced into the vessel type 300 L polymerization reactor with the stirring device by a slurry pump. Hexane was fed to the slurry pump so that the concentration of the slurry in the polymerization vessel was 40% by mass. The polymerization pressure was maintained at 0.5 MPa, and the polymerization temperature was maintained at 80° C. by jacket cooling. Hydrogen was continuously fed by a pump so that the hydrogen concentration on the basis of the ethylene in the gaseous phase was 25 mol %. The polymerization slurry was continuously extracted to the flash drum at a pressure of 0.05 MPa and a temperature of 70° C., resulting in the separation of unreacted ethylene and hydrogen. The ethylene polymer powder of Example 6 was obtained by the same operations as in Example 1 in the steps after the polymerization vessel. The microporous membrane of Example 6 was obtained by the same operations as in Example 1.

Example 7

The ethylene polymer powder of Example 7 was obtained by the same operations as in Example 4 except hydrogen concentration was 7.5 mol %, and propylene was fed so that propylene concentration was 0.2 mol % in the polymerization step. The microporous membrane of Example 7 was obtained by the same operations as in Example 1.

Example 8

The ethylene polymer powder of Example 8 was obtained by the same operations as in Example 3 except the retention time of the polymerization slurry in the buffer tank was 1 hour in the polymerization step. The microporous membrane of Example 8 was obtained by the same operations as in Example 1.

Comparative Example 1

The ethylene polymer powder of Comparative Example 1 was obtained by the same operations as in Example 1 except that hydrogen concentration was 23 mol % in the polymerization step. The microporous membrane of Comparative Example 1 was obtained by the same operations as in Example 1.

Comparative Example 2

The ethylene polymer powder of Comparative Example 2 was obtained by the same operations as in Example 1 except the hydrogen concentration was 1.5 mol % in the polymerization step. The microporous membrane of Comparative Example 2 was obtained by the same operations as in Example 1.

Comparative Example 3

The ethylene polymer powder of Comparative Example 3 was obtained by the same operations as in Example 3 except that the concentration of the slurry in the polymerization vessel was adjusted to 25% by mass in the polymerization step. The microporous membrane of Comparative Example 3 was obtained by the same operations as in Example 1.

Comparative Example 4

The ethylene polymer powder of Comparative Example 4 was obtained by the same operations as in Example 3 except that the polymerization slurry was sent to the centrifuge without keeping the polymerization slurry warm in the polymerization step. The temperature of the polymerization slurry fed to the centrifuge was 55° C. at this time. The microporous membrane of Comparative Example 4 was obtained by the same operations as in Example 1.

The physical properties of the ethylene polymer powders of Examples 1 to 8 and Comparative Examples 1 to 4 and the evaluation results of the microporous membranes are shown in Table 1.

TABLE 1

| | Unit | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Weight average molecular weight (Mw) | $10^4$ g/mol | 21.0 | 29.1 | 49.5 | 68.3 | 79.4 | 61.1 | 135.2 | 50.1 | 15.7 | 320.0 | 51.5 | 48.2 |
| α Component of pulse NMR at 130° C. | % | 42 | 47 | 52 | 44 | 56 | 43 | 51 | 54 | 35 | 61 | 40 | 36 |
| Ratio β/γ between components of pulse NMR at 130° C. | — | 1.5 | 1.7 | 2.0 | 3.0 | 1.3 | 1.3 | 2.2 | 2.0 | 0.4 | 4.2 | 0.5 | 1.0 |
| Ratio α130/α30 between amounts of α components | — | 0.55 | 0.60 | 0.65 | 0.56 | 0.62 | 0.55 | 0.67 | 0.68 | 0.46 | 0.74 | 0.51 | 0.47 |
| Molecular weight distribution (Mw/Mn) | — | 9.5 | 14.4 | 9.9 | 11.2 | 5.8 | 28 | 11.8 | 10.1 | 10.5 | 9.5 | 10.7 | 10.3 |
| Residual catalyst ash content | ppm | 11 | 15 | 17 | 22 | 8 | 22 | 28 | 17 | 12 | 15 | 35 | 52 |
| Particle size distribution (D90/D10) | — | 1.53 | 1.35 | 1.63 | 1.66 | 1.68 | 1.61 | 1.81 | 1.62 | 1.5 | 1.75 | 1.61 | 1.57 |
| Membrane thickness | μm | 16 | 15 | 15 | 14 | 14 | 15 | 14 | 15 | 16 | 16 | 15 | 15 |
| Heat shrinkage percentage (125° C.) | % | 3 | 2 | 1 | 1 | 1 | 4 | 2 | 1 | 5 | 10 | 4 | 5 |
| Porosity (125° C.) | % | 58 | 57 | 56 | 56 | 54 | 56 | 54 | 56 | 58 | 54 | 56 | 55 |
| Change in heat shrinkage percentage | — | ○ | ◎ | ◎ | ◎ | ◎ | ○ | ◎ | ◎ | X | ○ | ○ | X |
| Change in porosity | — | ○ | ◎ | ◎ | ◎ | ○ | ○ | ◎ | ◎ | X | ○ | X | ○ |
| Appearance of membrane | — | ◎ | ○ | ◎ | ○ | ○ | ○ | ○ | ◎ | ◎ | X | ◎ | ◎ |
| Unevenness of porosity | — | ◎ | ◎ | ◎ | ◎ | ◎ | ○ | ○ | ○ | ◎ | X | ◎ | ◎ |
| Sediment on die | — | ○ | ○ | ○ | ○ | ○ | ○ | ○ | ○ | X | ○ | X | ○ |

The present application is based on the Japanese Patent Application (Japanese Patent Application No. 2016-218190) filed on Nov. 8, 2016, the contents of which are incorporated herein by reference.

INDUSTRIAL APPLICABILITY

Since an ethylene polymer of the present invention is excellent in heat resistance, a film, a microporous membrane and the like containing the ethylene polymer become excellent in heat shrinkage resistance. When the microporous membrane is formed, the ethylene polymer can be particularly annealed at a high temperature for a short period of time with the porosity maintained. Since the ethylene polymer can be preferably used for microporous membranes for which high productivity is required, the ethylene polymer has high industrial applicability.

The invention claimed is:
1. An ethylene polymer, wherein the ethylene polymer has a weight average molecular weight (Mw) of 200,000 or more and 3,000,000 or less,
a proportion of a component (α130) with the lowest mobility of 40% or more and 60% or less and a ratio β/γ of a proportion of a middle motion component (β) to a proportion of a component (γ) with the highest mobility of 1.0 or more and 4.0 or less when a three-component approximation of free induction decay at 130° C. measured by a solid echo method of pulse NMR is performed, wherein the ethylene polymer has a molecular weight distribution (Mw/Mn) of 5 or more and 15 or less, and wherein the ethylene polymer has a content of one or more selected from the group consisting of Ti, Mg and Al of 50 ppm or less.
2. The ethylene polymer according to claim 1, wherein the ethylene polymer has a ratio (α130/(α30) of a proportion of the component (α130) with the lowest mobility measured at 130° C. to a proportion of a component (α30) with the lowest mobility measured at 30° C. by the solid echo of pulse NMR of 0.1 or more and 0.65 or less.

3. The ethylene polymer according to claim 1, wherein the ethylene polymer has a weight average molecular weight (Mw) of 250,000 or more and 800,000 or less.

4. The ethylene polymer according to claim 1, wherein a shape of the ethylene polymer is powder.

5. The ethylene polymer according claim 1, wherein the ethylene polymer has a particle size ratio D90/D10 measured using a laser particle size meter of 1.30 to 1.80.

6. A stretched molded article, comprising the ethylene polymer according to claim 1.

7. A microporous membrane, comprising the ethylene polymer according to claim 1.

8. A stretched molded article, comprising the ethylene polymer according claim 2.

9. A microporous membrane, comprising the ethylene polymer according claim 2.

10. A stretched molded article, comprising the ethylene polymer according claim 3.

11. A microporous membrane, comprising the ethylene polymer according claim 3.

12. A stretched molded article, comprising the ethylene polymer according claim 4.

13. A microporous membrane, comprising the ethylene polymer according claim 4.

14. A stretched molded article, comprising the ethylene polymer according claim 5.

15. A microporous membrane, comprising the ethylene polymer according claim 5.

* * * * *